(12) United States Patent
Chan

(10) Patent No.: US 10,335,799 B2
(45) Date of Patent: Jul. 2, 2019

(54) WATER JET SPLITTING CHAMBER FOR WASTE TIRES

(71) Applicant: ECOFORTUNE RENEWABLE ENERGY CO., LTD, Taipei (TW)

(72) Inventor: Kai-Chen Chan, New Taipei (TW)

(73) Assignee: Ecofortune Renewable Energy Co., Ltd., Taipei (TW)

( * ) Notice: Subject to any disclaimer, the term of this patent is extended or adjusted under 35 U.S.C. 154(b) by 366 days.

(21) Appl. No.: 15/275,569

(22) Filed: Sep. 26, 2016

(65) Prior Publication Data
US 2018/0085971 A1    Mar. 29, 2018

(51) Int. Cl.
| | |
|---|---|
| *B02C 19/06* | (2006.01) |
| *B29B 17/04* | (2006.01) |
| *B02C 19/00* | (2006.01) |
| *B29L 30/00* | (2006.01) |

(52) U.S. Cl.
CPC ........ *B02C 19/0056* (2013.01); *B02C 19/061* (2013.01); *B29B 17/0404* (2013.01); *B29B 2017/0428* (2013.01); *B29L 2030/002* (2013.01)

(58) Field of Classification Search
CPC ..... B02C 19/06; B29B 17/04; B29B 17/0412; B29B 2017/0428
USPC .................................................... 241/39, 40
See application file for complete search history.

(56) References Cited

U.S. PATENT DOCUMENTS

| | | | | |
|---|---|---|---|---|
| 3,942,565 A | * | 3/1976 | Ratelle | ...................... B27L 1/14 |
| | | | | 144/340 |
| 4,813,614 A | * | 3/1989 | Moore | ..................... B02C 19/18 |
| | | | | 241/101.71 |
| 5,234,172 A | * | 8/1993 | Chupka | ..................... D21F 7/04 |
| | | | | 162/194 |
| 6,923,392 B2 | | 8/2005 | Hong et al. | |
| 2010/0144973 A1 | | 6/2010 | Cheng et al. | |

FOREIGN PATENT DOCUMENTS

| | | | |
|---|---|---|---|
| CN | 200988284 Y | 12/2007 | |
| CN | 100453287 C | 1/2009 | |
| CN | 201175973 Y | 1/2009 | |
| JP | H03256698 A | * 11/1991 | ............. B29B 17/02 |
| TW | 200840657 A | 10/2008 | |
| TW | 201014691 A | 4/2010 | |

\* cited by examiner

*Primary Examiner* — Shelley M Self
*Assistant Examiner* — Jared O Brown
(74) *Attorney, Agent, or Firm* — Alan D. Kamrath; Mayer & Williams PC

(57) ABSTRACT

A water jet splitting chamber for waste tires has a chamber body, a water jet module, and an actuator. The chamber body has a retaining wall located in the chamber body to divide the chamber body into a splitting space and an actuator space. The water jet module is mounted in the splitting space, and has a slide seat mounted on the chamber body and at least one water jet seat mounted on the slide seat and being capable of linearly moving along a mounting direction of the slide seat. The actuator is mounted in the actuator space, and has a motor and multiple linking rods. The multiple linking rods are driven by the motor and extend into the splitting space, extending directions of the multiple linking rods are along the mounting direction of the slide seat, and the water jet heads face toward the multiple linking rods.

14 Claims, 4 Drawing Sheets

WATER JET SPLITTING CHAMBER FOR WASTE TIRES

BACKGROUND OF THE INVENTION

1. Field of the Invention

The present invention relates to a waste processing device and, more particularly, to a water jet splitting chamber for waste tires.

2. Description of Related Art

On average, each household has at least one automobile. Production of tires increases, so the amount of waste tires also increases. The waste tires mean tires that are replaced or discarded and lose use value. The waste tires cannot be biologically decomposed, so recycling and reusing the waste tires can slow down consumption of natural rubber resources, and can reduce damage to the environment.

The waste tires can be directly recycled and reused in original shapes, but the amount is quite rare. The waste tire is mainly made of vulcanized rubber, and multiple support materials, such as steel, are disposed internally in the waste tire, such that it is difficult to directly recycle the rubber of the waste tire. A conventional recycling method which manufactures solid waste fuel by pyrolysis, devulcanization, or mixing other combustible waste is disclosed in TW patent no. 1382048. Another conventional recycling method is rubbing off an outer layer of the waste tire and then pasting a new rubber material and vulcanizing to get a retreaded tire. Another conventional recycling method is mechanical crushing and decomposing steel, cotton, and so on to get rubber powder disclosed in TW publication no. 200840657, CN patent no. 201175973, TW publication no. 201014691, and U.S. Pat. No. 6,923,392. In the mentioned methods, the method which mechanically crushes and decomposes the waste tires has relatively low cost and produces less pollution, and the rubber powder is also easily recycled.

The method which mechanically crushes and decomposes the waste tires is also disclosed in CN publication no. 200988284 and CN publication no. 100453287. A recycling device comprises a high-pressure generating module, multiple rotating water jet seats, a tire holder, and a water tank. Each rotating water jet seat has multiple water jet heads disposed on the rotating water jet seat. The water jet heads jet out high-speed water jets toward waste tires arranged on the tire holder during rotation. The high-speed water jets split surfaces of the waste tires into rubber powder, and the rubber powder is collected to be reused.

However, the water jet heads jet out the high-speed water jets toward waste tires during rotation, so an axial force of the water jets will be partially transformed into a radial force due to a centrifugal force, such that the water jets will jet toward the waste tire circumferentially and radially. The axial force will be dispersed because of rotation such that a splitting effect is decreased. Furthermore, the water jet heads are arranged as a curve, so the water jet heads can only split once for a waste tire such that an operation effect is decreased. The recycling device lacks a structure which can collect rubber powder, such that the rubber powder will be dispersed everywhere in the recycling device. So after splitting, the rubber powder needs to be collected manually. The above problems need to be resolved.

SUMMARY OF THE INVENTION

The main objective of the present invention is to provide a water jet splitting chamber for waste tires to resolve the mentioned problems.

The water jet splitting chamber for waste tires comprises a chamber body, a water jet module, and an actuator.

The chamber body comprises a retaining wall and an entrance. The retaining wall is located in the chamber body, such that an inner space in the chamber body is divided into a splitting space and an actuator space which are isolated from each other by the retaining wall. The entrance is disposed on a front side of the chamber body and communicates with the splitting space.

The water jet module is mounted in the splitting space, and comprises a slide seat and at least one water jet seat. The slide seat is elongated, is horizontally mounted on one of multiple interior walls of the chamber body, and is located on a side of the splitting space. The at least one water jet seat is mounted on the slide seat, is capable of linearly moving along a mounting direction of the slide seat, and comprises multiple water jet heads.

The actuator is mounted in the actuator space of the chamber body, and comprises a motor located in the actuator space and multiple linking rods. The multiple linking rods are driven by the motor and extend into the splitting space, extending directions of the multiple linking rods are along the mounting direction of the slide seat, and the water jet heads of the at least one water jet seat face toward the multiple linking rods.

Other objectives, advantages and novel features of the present invention will become more apparent from the following detailed description when taken in conjunction with the accompanying drawings.

DETAILED DESCRIPTION OF PREFERRED EMBODIMENT

Figure 1:
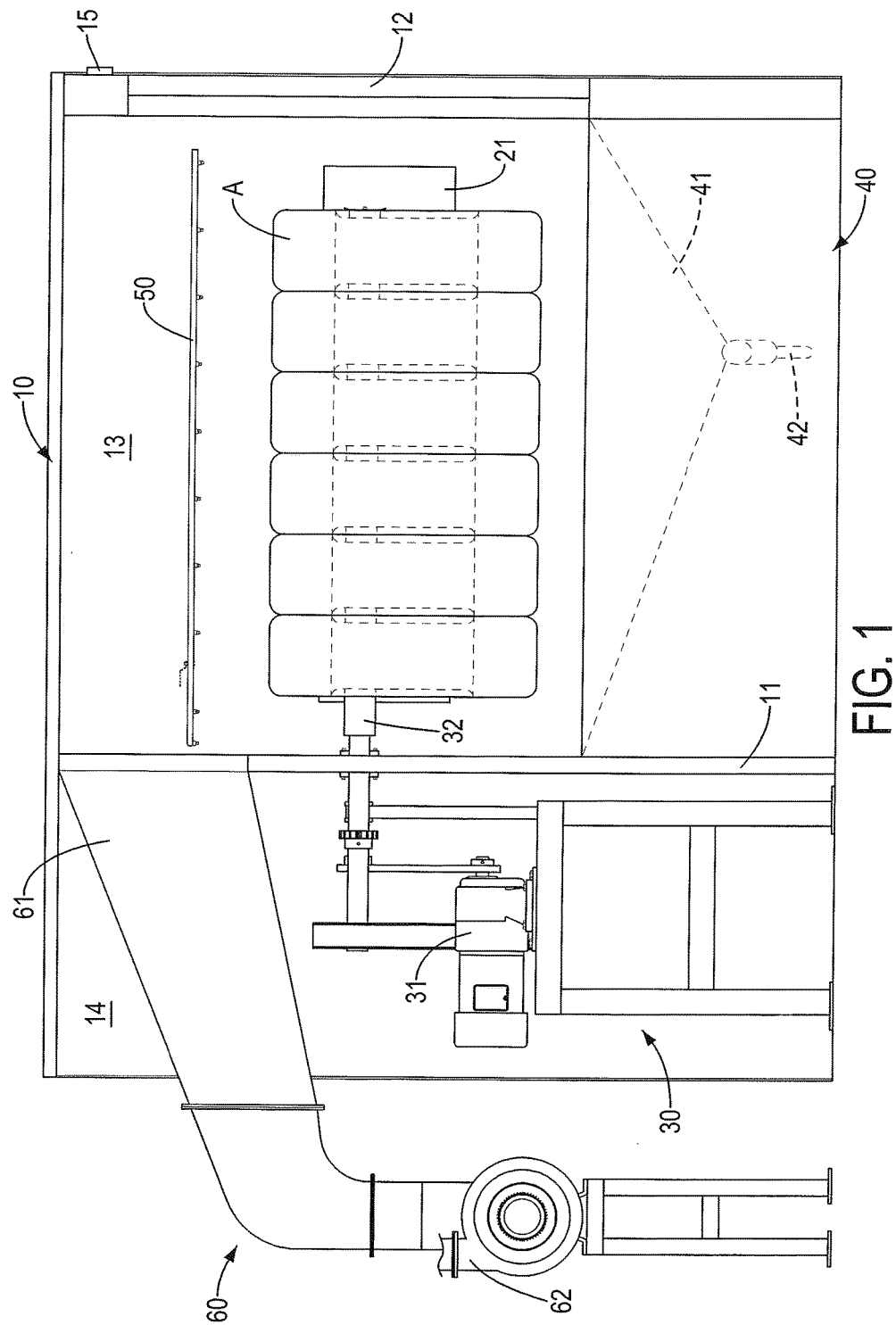
FIG. 1 is a side view of a preferred embodiment of a water jet splitting chamber for waste tires in accordance with the present invention.
Figure 2:
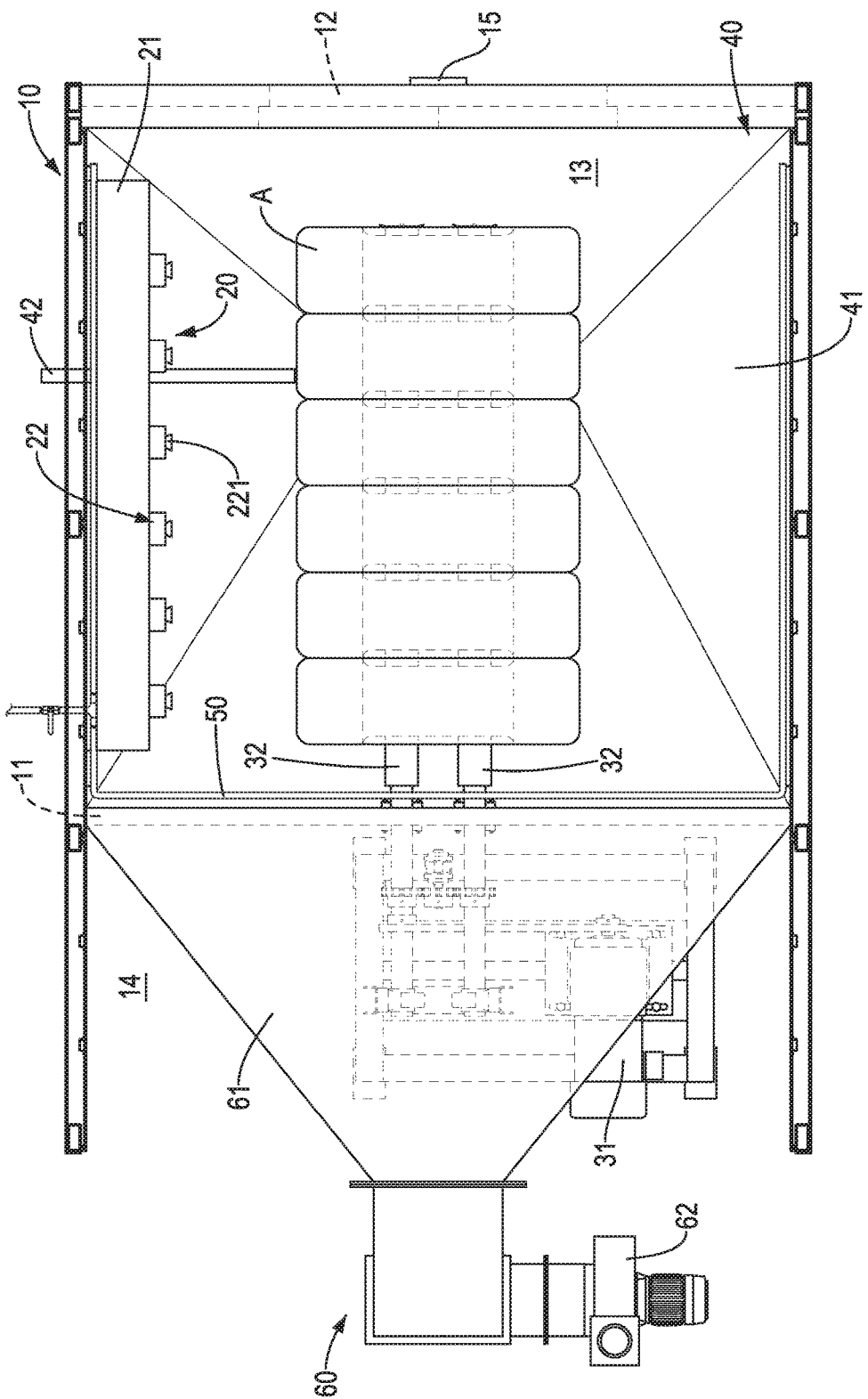
FIG. 2 is a top view of a preferred embodiment of the water jet splitting chamber for waste tires of FIG. 1.
Figure 3:
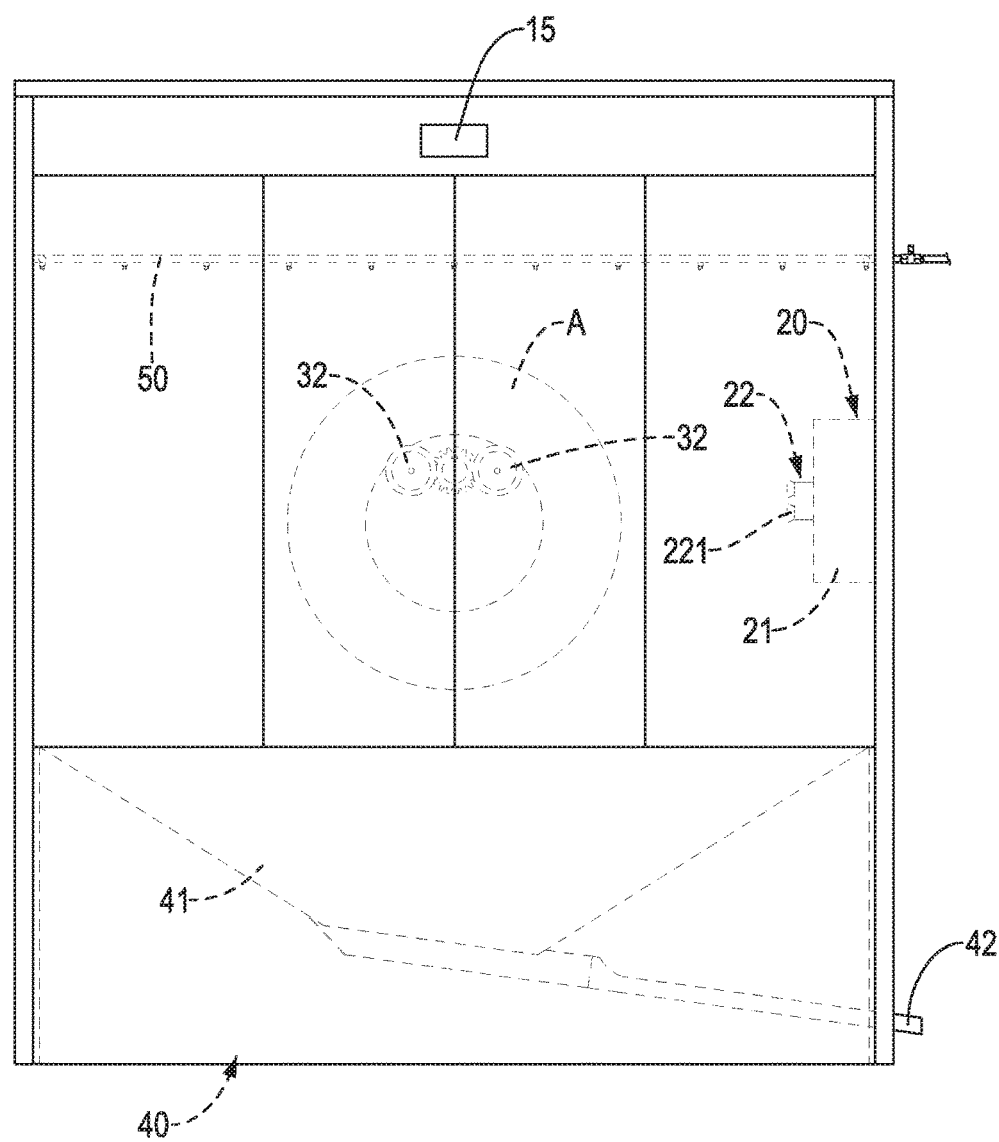
FIG. 3 is a front view of a preferred embodiment of the water jet splitting chamber for waste tires of FIG. 1.

With reference to FIGS. 1 to 3, a preferred embodiment of a water jet splitting chamber for waste tires in accordance with the present invention comprises a chamber body 10, a water jet module 20, an actuator 30, a material receiving structure 40, a sprinkler module 50, and a dust collection module 60.

The chamber body 10 comprises a retaining wall 11 and an entrance 12. The retaining wall 11 is located in the chamber body 10, such that an inner space in the chamber body 10 is divided into a splitting space 13 and an actuator space 14 which are isolated from each other by the retaining wall 11. The entrance 12 is disposed in a front side of the chamber body 10 and communicates with the splitting space 13. Preferably, the chamber body 10 further comprises a sensor 15 mounted above the entrance 12.

The water jet module 20 is mounted on one of multiple interior walls of the chamber body 10, is located at a side of the splitting space 13, and comprises a slide seat 21 and at least one water jet seat 22. The slide seat 21 is elongated and is horizontally mounted on one of the interior walls of the chamber body 10, and is located at a side of the splitting space 13. The at least one water jet seat 22 is mounted on the slide seat 21 and is capable of linearly moving along a mounting direction of the slide seat 21. The at least one water jet seat 22 comprises multiple water jet heads 221.

The actuator 30 is mounted in the actuator space 14 of the chamber body 10, and comprises a motor 31 and multiple linking rods 32. The motor 31 is held in the actuator space 14. The linking rods 32 are driven by the motor 31 and extend into the splitting space 13. Extending directions of the linking rods 32 are along the mounting direction of the slide seat 21 to be approximately parallel with the slide seat 21. The water jet heads 221 of the at least one water jet seat 22 face toward the linking rods 32. The motor 31 can drive the linking rods 32 to rotate by belts, gears, or chains.

The material receiving structure 40 is mounted in the splitting space 13 of the chamber body 10, and comprises a receiving funnel 41 and a collection tube 42. The receiving funnel 41 is located below the linking rods 32 and is tapered downward. Preferably, the receiving funnel 41 covers a bottom of the splitting space 13, and is tapered from a periphery of the receiving funnel 41 to a middle of the receiving funnel 41. The collection tube 42 communicates with a bottom of the receiving funnel 41 and is inclined downward to pass through the chamber body 10 to communicate with the outside environment.

The sprinkler module 50 is mounted on at least one of the interior walls of the chamber body 10, and is located in the splitting space 13. A position of the sprinkler module 50 is higher than positions of the linking rods 32. Preferably, the sprinkler module 50 is mounted on three of the interior walls of the chamber body 10 to be disposed as a U shape.

Figure 4:
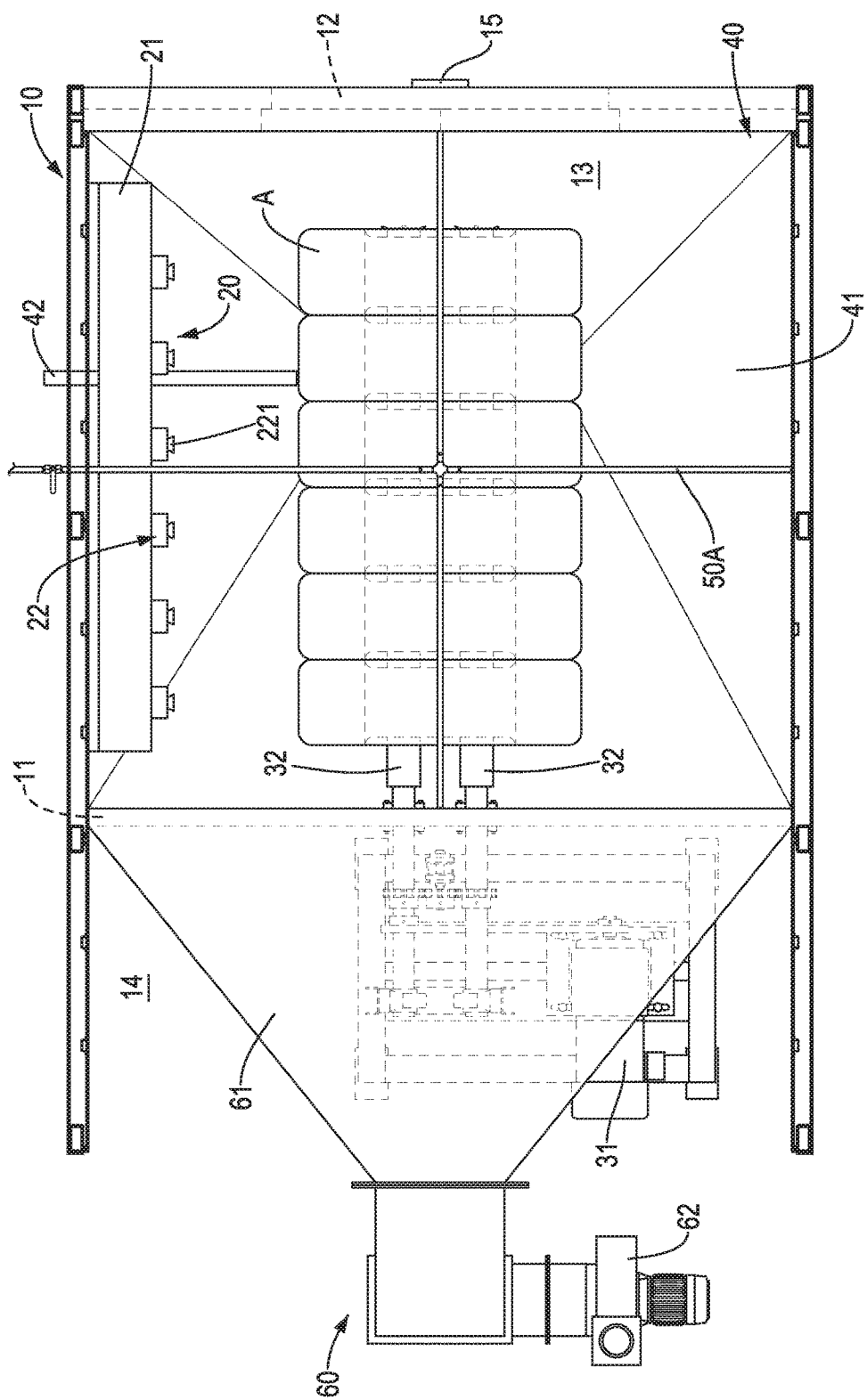
FIG. 4 is a top view of the water jet splitting chamber for waste tires, wherein with the sprinkler module crosswise mounted on the chamber body.

With further reference to FIG. 4, alternatively, the sprinkler module 50 may be crosswise mounted on one of the interior walls of the chamber body 10 and be located at a top of the chamber body 10. As long as the sprinkler module 50, 50A can face toward the linking rods 32 to sprinkle on the linking rods 32, a disposed position of the sprinkler module 50, 50A is not limited.

With reference to FIGS. 1 to 3, the dust collection module 60 communicates with the splitting space 13, is located outside the splitting space 13, and comprises a collection cover 61 and a blower 62. The collection cover 61 is connected with the retaining wall 11. The retaining wall 11 further comprises multiple channels communicating between the collection cover 61 and the splitting space 13. The blower 62 is connected with the collection cover 61 and is located outside the chamber body 10.

Before waste tires A are split, the waste tires A are transported from the outside to the entrance 12. The sensor 15 can sense the waste tires A and drives the entrance 12 to be opened. Then, the waste tires A are transported from the entrance 12 to the splitting space 13. Preferably, six of the waste tires A can be transported into the splitting space 13 at a time. The waste tires A are sequentially arranged around the linking rods 32. When the motor 31 drives the linking rods 32 to rotate, the waste tires A are also driven to rotate by the linking rods 32. At the same time, the at least one water jet seat 22 of the water jet module 20 jets out a high-speed water jet toward the waste tires A while moving along the slide seat 21.

Referring to amounts of the at least one water jet seat 22, the water jet module 20 may comprise only one water jet seat 22. The water jet seat 22 can move back and forth along a width of the six waste tires A. Preferably, the water jet module 20 may comprise six water jet seats 22 to respectively correspond to the six waste tires A. Each water jet seat 22 moves back and forth along a width of the corresponding waste tires A. Alternatively, the water jet module 20 may comprise three water jet seats 22, such that the six waste tires A are grouped into three pairs to respectively correspond to the three water jet seats 22. Each water jet seat 22 moves back and forth along a width of the corresponding pair of waste tires A. Amounts of the water jet seat 22 and a movement way of the water jet seat 22 are not limited in the present invention.

The water jet seats 22 jet out high-speed water jets toward the waste tires A to split rubber on surfaces of the waste tires A to form a rubber powder. Most of the rubber powder falls into the receiving funnel 41, and is collected in the collection tube 42 to be transported out from the chamber body 10. Part of the rubber powder does not fall into the receiving funnel 41 but instead is attached to the surfaces of the waste tires A or the interior walls of the chamber body 10. The sprinkler module 50 sprinkles toward the waste tires A, such that the part of the rubber powder that does not fall into the receiving funnel 41 can be flushed to flow into the receiving funnel 41. The blower 62 withdraws air from the splitting space 13 of the chamber body 10 through the collection cover 61, such that dust which is raised when the water jet module 20 is splitting the waste tires A is also withdrawn from the splitting space 13 and does not fall into the receiving funnel 41.

The slide seat 21 is horizontally mounted on one of the interior walls of the chamber body 10, and is located at a side of the chamber body 10. The extending directions of the linking rods 32 are along the mounting direction of the slide seat 21. The water jets seats 22 are mounted on the slide seat 21 and are capable of linearly moving along the mounting direction of the slide seat 21. The water jet heads 221 disposed on the water jet seats 22 face toward the linking rods 32 to jet out high-speed water jets to split the waste tires A arranged around the linking rods 32. Because the water jet seats 22 linearly move along the mounting direction of the slide seat 21 back and forth, the high-speed water jets jetted by the water jet heads 221 can directly split rubber on the surfaces of the waste tires A instead of being transferred to a radial direction of each water jet head 221. A splitting force of the water jets will not be dispersed due to rotation, such that a splitting effect of the water jets can be increased. The water jet seats 22 are linearly arranged on the slide seat 21 to split the six waste tires A to increase an operation effect. Rubber powder will fall into the receiving funnel 41. Even though the rubber powder is attached to the surfaces of the waste tires A or the interior walls of the chamber body 10, the rubber powder also can be flushed to flow into the receiving funnel 41 by the water which is sprinkled from the sprinkler module 50. The split rubber powder will be collected in the receiving funnel 41 automatically, and be transported out of the chamber body 10 from the collection tube 42 to decrease a manual collection time. The dust collection module 60 can draw away the dust which is raised when the water jet module 20 is splitting the waste tires A, so the dust will not fall into the receiving funnel 41. Therefore, the water jet splitting chamber for waste tires indeed can improve a splitting effect for splitting the waste tires A.

From the above description, it is noted that the present invention has the following advantages:

1. Improving the splitting effect: the water jet seats 22 jet the high-speed water jets when linearly moving along the mounting direction of the slide seat 21 back and forth, so the high-speed water jets can directly split rubber on the surfaces of the waste tires A instead of being transferred to the radial direction of each water jet head 221. The splitting force of the water jet can be concentrated on the waste tires A.

2. Improving the operation effect: the water jet seats 22 are linearly arranged on the slide seat 21, such that the water jet seats 22 can split the multiple waste tires A at a time.

3. Improving a collection effect for the rubber powder: the rubber powder will fall into the receiving funnel 41, or be flushed to flow into the receiving funnel 41 automatically by the water which is sprinkled from the sprinkler module 50, 50A, and be transported out of the chamber body 10 from the collection tube 42. The dust will be drawn away by the dust collection module 60, such that the dust will not fall into the receiving funnel 41. Therefore, the collection effect for the rubber powder can be increased.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water jet splitting chamber for waste tires comprising:
    a chamber body comprising:
        a retaining wall located in the chamber body, wherein an inner space in the chamber body is divided into a splitting space and an actuator space which are isolated from each other by the retaining wall; and
        an entrance disposed in a front side of the chamber body and communicating with the splitting space;
    a water jet module mounted in the splitting space and comprising:
        a slide seat being elongated, horizontally mounted on one of multiple interior walls of the chamber body, and located at a side of the splitting space; and
        at least one water jet seat mounted on the slide seat, linearly moveable along a mounting direction of the slide seat, and comprising multiple water jet heads;
    an actuator mounted in the actuator space of the chamber body and comprising:
        a motor located in the actuator space; and
        multiple linking rods driven by the motor and extending into the splitting space, with extending directions of the multiple linking rods being along the mounting direction of the slide seat, and with the multiple water jet heads of the at least one water jet seat facing toward the linking rods; and
    a dust collection module communicating with the splitting space, located outside the splitting space, and comprising:
        a collection cover connected with the retaining wall, with the retaining wall further comprising multiple channels communicating between the collection cover and the splitting space; and
        a blower connected with the collection cover and located outside the chamber body.

2. The water jet splitting chamber for waste tires as claimed in claim 1, further comprising a material receiving structure mounted in the splitting space of the chamber body and comprising:
    a receiving funnel located below the multiple linking rods and tapered downward; and
    a collection tube communicating with a bottom of the receiving funnel and inclined downward to pass through the chamber body.

3. The water jet splitting chamber for waste tires as claimed in claim 1, wherein the chamber body further comprises a sensor mounted above the entrance.

4. The water jet splitting chamber for waste tires as claimed in claim 2 further comprising a sprinkler module mounted on at least one of the interior walls of the chamber body and located in the splitting space at a position higher than positions of the multiple linking rods.

5. The water jet splitting chamber for waste tires as claimed in claim 2, wherein the chamber body further comprises a sensor mounted above the entrance.

6. The water jet splitting chamber for waste tires as claimed in claim 4, wherein the chamber body further comprises a sensor mounted above the entrance.

7. The water jet splitting chamber for waste tires as claimed in claim 4 wherein the receiving funnel covers a bottom of the splitting space and is tapered from a periphery of the receiving funnel to a middle of the receiving funnel.

8. The water jet splitting chamber for waste tires as claimed in claim 7, wherein the chamber body further comprises a sensor mounted above the entrance.

9. A water jet splitting chamber for waste tires comprising:
    a chamber body comprising:
        a retaining wall located in the chamber body, wherein an inner space in the chamber body is divided into a splitting space and an actuator space which are isolated from each other by the retaining wall; and
        an entrance disposed in a front side of the chamber body and communicating with the splitting space;
    a water jet module mounted in the splitting space and comprising:
        a slide seat being elongated, horizontally mounted on one of multiple interior walls of the chamber body, and located at a side of the splitting space; and
        at least one water jet seat mounted on the slide seat, linearly moveable along a mounting direction of the slide seat, and comprising multiple water jet heads;
    an actuator mounted in the actuator space of the chamber body and comprising:
        a motor located in the actuator space;
        multiple linking rods driven by the motor and extending into the splitting space, with extending directions of the multiple linking rods being along the mounting direction of the slide seat, and with the multiple water jet heads of the at least one water jet seat facing toward the linking rods;
    a material receiving structure mounted in the splitting space of the chamber body and comprising:
        a receiving funnel located below the multiple linking rods and tapered downward; and
        a collection tube communicating with a bottom of the receiving funnel and inclined downward to pass through the chamber body; and
    sprinkler module mounted on three of the interior walls of the chamber body and located in the splitting space at a position higher than positions of the multiple linking rods, wherein the sprinkler module is mounted on the three interior walls of the chamber body to be disposed as a U shape.

10. The water jet splitting chamber for waste tires as claimed in claim 9 further comprising a dust collection module communicating with the splitting space, located outside the splitting space, and comprising:

a collection cover connected with the retaining wall, with the retaining wall further comprising multiple channels communicating between the collection cover and the splitting space; and a blower connected with the collection cover and located outside the chamber body.

11. The water jet splitting chamber for waste tires as claimed in claim 10, wherein the chamber body further comprises a sensor mounted above the entrance.

12. A water jet splitting chamber for waste tires comprising:

a chamber body comprising:
  a retaining wall located in the chamber body, wherein an inner space in the chamber body is divided into a splitting space and an actuator space which are isolated from each other by the retaining wall; and
  an entrance disposed in a front side of the chamber body and communicating with the splitting space;

a water jet module mounted in the splitting space and comprising:
  a slide seat being elongated, horizontally mounted on one of multiple interior walls of the chamber body, and located at a side of the splitting space; and
  at least one water jet seat mounted on the slide seat, linearly moveable along a mounting direction of the slide seat, and comprising multiple water jet heads;

an actuator mounted in the actuator space of the chamber body and comprising:
  a motor located in the actuator space;
  multiple linking rods driven by the motor and extending into the splitting space, with extending directions of the multiple linking rods being along the mounting direction of the slide seat, and with the multiple water jet heads of the at least one water jet seat facing toward the linking rods;

a material receiving structure mounted in the splitting space of the chamber body and comprising:
  a receiving funnel located below the multiple linking rods and tapered downward; and
  a collection tube communicating with a bottom of the receiving funnel and inclined downward to pass through the chamber body; and a sprinkler module mounted on at least one of the interior walls of the chamber body and located in the splitting space at a position higher than positions of the multiple linking rods, wherein the sprinkler module is crosswise mounted on one of the interior walls of the chamber body and located at a top of the chamber body.

13. The water jet splitting chamber for waste tires as claimed in claim 12 further comprising a dust collection module communicating with the splitting space, located outside the splitting space, and comprising:

a collection cover connected with the retaining wall, with the retaining wall further comprising multiple channels communicating between the collection cover and the splitting space; and a blower connected with the collection cover and located outside the chamber body.

14. The water jet splitting chamber for waste tires as claimed in claim 13, wherein the chamber body further comprises a sensor mounted above the entrance.

* * * * *